(12) United States Patent
McElvain et al.

(10) Patent No.: US 7,894,109 B2
(45) Date of Patent: Feb. 22, 2011

(54) SYSTEM AND METHOD FOR CHARACTERIZING SPATIAL VARIANCE OF COLOR SEPARATION MISREGISTRATION

(75) Inventors: Jon McElvain, Manhattan Beach, CA (US); Charles Michael Hains, Altadena, CA (US)

(73) Assignee: Xerox Corporation, Stamford, CT (US)

( * ) Notice: Subject to any disclaimer, the term of this patent is extended or adjusted under 35 U.S.C. 154(b) by 1240 days.

(21) Appl. No.: 11/496,927

(22) Filed: Aug. 1, 2006

(65) Prior Publication Data

US 2008/0030789 A1    Feb. 7, 2008

(51) Int. Cl.
H04N 1/46    (2006.01)
(52) U.S. Cl. .................. 358/515; 358/504; 358/3.27; 358/1.9
(58) Field of Classification Search .................. None
See application file for complete search history.

(56) References Cited

U.S. PATENT DOCUMENTS

| | | | |
|---|---|---|---|
| 4,391,505 A | 7/1983 | Silverberg | |
| 4,546,700 A | 10/1985 | Kishner et al. | |
| 4,788,116 A | 11/1988 | Hochberg | |
| 4,831,420 A | 5/1989 | Walsh et al. | |
| 4,937,664 A | 6/1990 | Chiku et al. | |
| 5,081,507 A | 1/1992 | Monkelbaan et al. | |
| 5,184,011 A | 2/1993 | Hubble, III et al. | |
| 5,227,815 A | 7/1993 | Dastin et al. | |
| 5,260,725 A | 11/1993 | Hammond | |
| 5,272,493 A | 12/1993 | Hubble, III et al. | |
| 5,278,625 A | 1/1994 | Charnitski et al. | |
| 5,287,162 A | 2/1994 | de Jong et al. | |
| 5,329,466 A | 7/1994 | Monney | |
| 5,339,150 A | 8/1994 | Hubble, III et al. | |
| 5,339,159 A | 8/1994 | Nakamura et al. | |
| 5,342,715 A | 8/1994 | Kamath et al. | |
| 5,384,592 A | 1/1995 | Wong | |
| 5,406,066 A | 4/1995 | Steinle et al. | |

(Continued)

OTHER PUBLICATIONS

Arney et al., "Kubelka-Munk Theory and the MTF of Paper", *Journal of Imaging Science and Tech.*, vol. 47, No. 4, pp. 339-345 (Jul./Aug. 2003).

(Continued)

*Primary Examiner*—Mark K Zimmerman
*Assistant Examiner*—Dung D Tran
(74) *Attorney, Agent, or Firm*—Carter, DeLuca, Farrell & Schmidt, LLP (57) ABSTRACT

A method is provided for characterizing color separation misregistration of a printer device, the method including receiving from the printer device an output image having marked calibration patches having a variety of color separation configurations, each using a first and second color separation, and a marked measurement patch having a predetermined color separation configuration. Measured colorimetric values are received corresponding to the calibration patches and the marked measurement patch, and a characteristic of a curve associated with the measured colorimetric values corresponding to the calibration patches is determined. A calibration function is generated based on the determined characteristic of the curve, providing expected colorimetric values for the predetermined color separation configuration as related to a misregistration characteristic value. A misregistration characteristic value is determined from the calibration function that corresponds to the measured colorimetric value of the marked measurement patch for characterizing misregistration between the first and second color separations.

13 Claims, 7 Drawing Sheets

U.S. PATENT DOCUMENTS

| | | |
|---|---|---|
| 5,418,556 A | 5/1995 | Andrews |
| 5,457,518 A | 10/1995 | Ashikaga et al. |
| 5,523,823 A | 6/1996 | Ashikaga |
| 5,526,140 A | 6/1996 | Rozzi |
| 5,537,190 A | 7/1996 | Folkins et al. |
| 5,572,601 A | 11/1996 | Bloomberg |
| 5,574,527 A | 11/1996 | Folkins |
| 5,600,404 A * | 2/1997 | Ando et al. .................. 399/18 |
| 5,631,686 A | 5/1997 | Castelli et al. |
| 5,689,425 A | 11/1997 | Sainio et al. |
| 5,760,815 A | 6/1998 | Genovese |
| 5,768,671 A | 6/1998 | Komiya et al. |
| 5,774,156 A | 6/1998 | Guerin |
| 5,778,280 A | 7/1998 | Komiya et al. |
| 5,793,901 A | 8/1998 | Matsutake et al. |
| 5,808,658 A | 9/1998 | Hoover |
| 5,825,984 A | 10/1998 | Mori et al. |
| 5,838,465 A * | 11/1998 | Satou et al. ................. 358/520 |
| 5,887,996 A | 3/1999 | Castelli et al. |
| 5,909,235 A | 6/1999 | Folkins |
| 5,973,718 A | 10/1999 | Charnitski et al. |
| 5,995,802 A | 11/1999 | Mori et al. |
| 6,014,154 A | 1/2000 | Guerin |
| 6,035,076 A | 3/2000 | Nagase |
| 6,129,015 A | 10/2000 | Dewey |
| 6,133,932 A | 10/2000 | Webb et al. |
| 6,148,168 A | 11/2000 | Hirai et al. |
| 6,154,628 A | 11/2000 | Kawano |
| 6,164,847 A | 12/2000 | Allen |
| 6,185,402 B1 | 2/2001 | Linssen |
| 6,198,490 B1 | 3/2001 | Eom et al. |
| 6,198,549 B1 * | 3/2001 | Decker et al. ................ 358/504 |
| 6,198,550 B1 | 3/2001 | Toyoda |
| 6,215,512 B1 | 4/2001 | Imaizumi et al. |
| 6,236,470 B1 | 5/2001 | Seachman |
| 6,239,828 B1 | 5/2001 | Ito et al. |
| 6,246,857 B1 | 6/2001 | Tanaka |
| 6,253,678 B1 | 7/2001 | Wentworth |
| 6,275,244 B1 | 8/2001 | Omelchenko et al. |
| 6,288,556 B1 | 9/2001 | Sato et al. |
| 6,292,208 B1 | 9/2001 | Lofhus et al. |
| 6,295,435 B1 | 9/2001 | Shinohara et al. |
| 6,300,968 B1 | 10/2001 | Kerxhalli et al. |
| 6,310,681 B1 | 10/2001 | Taniwaki |
| 6,321,060 B1 | 11/2001 | Nakayasu et al. |
| 6,336,024 B1 | 1/2002 | Kanaya et al. |
| 6,369,842 B1 | 4/2002 | Abramsohn |
| 6,381,428 B1 | 4/2002 | Yamamoto et al. |
| 6,408,157 B1 * | 6/2002 | Tanaka et al. ................ 399/301 |
| 6,431,679 B1 * | 8/2002 | Li et al. ......................... 347/19 |
| 6,434,279 B1 * | 8/2002 | Shiba .......................... 382/294 |
| 6,441,915 B1 | 8/2002 | Imaizumi et al. |
| 6,449,060 B1 | 9/2002 | Kawai et al. |
| 6,456,310 B1 | 9/2002 | Wallace et al. |
| 6,456,311 B1 | 9/2002 | Harush et al. |
| 6,462,821 B1 | 10/2002 | Borton et al. |
| 6,493,010 B1 | 12/2002 | Takahashi et al. |
| 6,493,011 B1 | 12/2002 | Shioya |
| 6,493,064 B2 | 12/2002 | Cabiri et al. |
| 6,493,083 B2 | 12/2002 | Parisi et al. |
| 6,526,240 B1 | 2/2003 | Thomas et al. |
| 6,529,616 B1 | 3/2003 | Rasmussen et al. |
| 6,532,026 B2 * | 3/2003 | Takahashi et al. ............. 347/41 |
| 6,556,313 B1 | 4/2003 | Chang et al. |
| 6,643,035 B1 | 11/2003 | Salgado |
| 6,644,773 B2 | 11/2003 | Bildstein et al. |
| 6,804,485 B2 | 10/2004 | Martin et al. |
| 6,836,277 B2 * | 12/2004 | Tajima ....................... 347/232 |
| 6,842,590 B2 | 1/2005 | Dalal et al. |
| 6,856,336 B2 | 2/2005 | Toyoda |
| 6,889,028 B1 | 5/2005 | Hunold et al. |
| 6,909,516 B1 | 6/2005 | Hoover |
| 6,911,993 B2 | 6/2005 | Nishikawa et al. |
| 6,973,272 B2 | 12/2005 | Yamamoto et al. |
| 7,002,701 B1 | 2/2006 | Nakayasu et al. |
| 7,013,094 B2 | 3/2006 | Dalal et al. |
| 7,013,803 B2 | 3/2006 | Hansen et al. |
| 7,039,348 B2 | 5/2006 | Kerxhalli et al. |
| 7,055,928 B2 * | 6/2006 | Ishibashi et al. ............... 347/19 |
| 7,071,957 B2 | 7/2006 | Fujimoto |
| 7,075,561 B2 | 7/2006 | Ozawa et al. |
| 7,085,009 B2 | 8/2006 | Kawai et al. |
| 7,100,508 B1 | 9/2006 | Mader |
| 7,106,477 B2 | 9/2006 | Horobin |
| 7,123,381 B2 * | 10/2006 | Klassen ...................... 358/1.9 |
| 7,127,125 B2 | 10/2006 | Perlmutter et al. |
| 7,239,833 B2 * | 7/2007 | Tomita et al. ................ 399/299 |
| 7,400,430 B2 * | 7/2008 | Czyszczewski et al. ...... 358/515 |
| 7,443,535 B2 * | 10/2008 | Ishibashi ..................... 358/1.9 |
| 7,619,775 B2 * | 11/2009 | Kitamura et al. ............. 358/1.9 |
| 2001/0017645 A1 | 8/2001 | Toda |
| 2001/0021208 A1 | 9/2001 | Ueyanagi et al. |
| 2001/0033395 A1 | 10/2001 | Chizawa |
| 2001/0033686 A1 | 10/2001 | Klassen |
| 2002/0102114 A1 | 8/2002 | Kawanishi |
| 2002/0113968 A1 | 8/2002 | Parisi et al. |
| 2002/0118350 A1 | 8/2002 | Cabiri et al. |
| 2002/0122124 A1 | 9/2002 | Suda |
| 2002/0159802 A1 | 10/2002 | Katahira |
| 2002/0178952 A1 | 12/2002 | Sainio et al. |
| 2003/0002043 A1 | 1/2003 | Abdulhalim et al. |
| 2003/0044193 A1 | 3/2003 | Thomas et al. |
| 2003/0052959 A1 | 3/2003 | Fujimoto |
| 2003/0053093 A1 | 3/2003 | Eom |
| 2003/0090689 A1 | 5/2003 | Klassen |
| 2003/0098985 A1 | 5/2003 | Horobin et al. |
| 2003/0145745 A1 | 8/2003 | Hansen et al. |
| 2003/0145751 A1 | 8/2003 | Hansen et al. |
| 2003/0174184 A1 | 9/2003 | Bildstein et al. |
| 2003/0197877 A1 | 10/2003 | Lee |
| 2003/0210412 A1 * | 11/2003 | Ishibashi ..................... 358/1.9 |
| 2003/0214568 A1 | 11/2003 | Nishikawa et al. |
| 2004/0046981 A1 | 3/2004 | Taka et al. |
| 2004/0076450 A1 | 4/2004 | Martin et al. |
| 2004/0114025 A1 | 6/2004 | Kerxhalli et al. |
| 2004/0130737 A1 | 7/2004 | Kamimura et al. |
| 2004/0175196 A1 | 9/2004 | Yamamoto et al. |
| 2004/0227966 A1 * | 11/2004 | Lee ............................. 358/1.9 |
| 2004/0239746 A1 | 12/2004 | Ozawa et al. |
| 2005/0047834 A1 | 3/2005 | Tomita et al. |
| 2005/0069220 A1 * | 3/2005 | Czyszczewski et al. ...... 382/275 |
| 2005/0093956 A1 | 5/2005 | Egan |
| 2005/0111759 A1 | 5/2005 | Perlmutter et al. |
| 2005/0134874 A1 | 6/2005 | Overall et al. |
| 2005/0157297 A1 | 7/2005 | Abdulhalim et al. |
| 2005/0206934 A1 | 9/2005 | Nishikawa et al. |
| 2005/0206980 A1 * | 9/2005 | Nishikawa et al. .......... 358/518 |
| 2005/0208685 A1 | 9/2005 | Abdulhalim et al. |
| 2005/0214037 A1 | 9/2005 | Kishi |
| 2006/0001765 A1 | 1/2006 | Suda |
| 2006/0005722 A1 | 1/2006 | Nobukawa et al. |
| 2006/0013603 A1 | 1/2006 | Matsuyama |
| 2006/0056882 A1 | 3/2006 | Kwon et al. |
| 2006/0065625 A1 | 3/2006 | Abdulhalim et al. |
| 2006/0114282 A1 | 6/2006 | Mizes et al. |
| 2006/0114283 A1 | 6/2006 | Mizes et al. |
| 2006/0115303 A1 | 6/2006 | Kang et al. |
| 2006/0119690 A1 | 6/2006 | Park |
| 2006/0120626 A1 | 6/2006 | Perlmutter et al. |
| 2006/0120772 A1 | 6/2006 | Kitazawa et al. |
| 2006/0132807 A1 | 6/2006 | Abdulhalim et al. |
| 2006/0139433 A1 * | 6/2006 | Yoshida ...................... 347/116 |
| 2006/0164506 A1 | 7/2006 | Kitao |
| 2006/0171748 A1 | 8/2006 | Inui et al. |

| | | |
|---|---|---|
| 2006/0176354 A1 | 8/2006 | Yoshida |
| 2006/0176355 A1 | 8/2006 | An |
| 2006/0177246 A1 | 8/2006 | Kawada et al. |
| 2006/0182472 A1 | 8/2006 | Munakata et al. |
| 2006/0191437 A1 | 8/2006 | Mader |
| 2006/0244980 A1 | 11/2006 | Grace |
| 2006/0262326 A1* | 11/2006 | Abdulhalim et al. ........ 356/625 |
| 2006/0263120 A1 | 11/2006 | Hayakawa |
| 2006/0275057 A1 | 12/2006 | Suzuki |
| 2006/0290767 A1 | 12/2006 | Tezuka et al. |
| 2007/0003332 A1 | 1/2007 | Kim |
| 2007/0019056 A1 | 1/2007 | Jung et al. |
| 2007/0048031 A1 | 3/2007 | Kinoshita |
| 2007/0077059 A1 | 4/2007 | Denoue et al. |
| 2007/0115339 A1 | 5/2007 | Matsuzaki et al. |

OTHER PUBLICATIONS

Oztan et al., "Quantitative Evaluation of Misregistration Induced Color Shifts in Color Halftones", *Color Imaging X: Processing, Hardcopy, and Applications, Proc. Of SPIE=IS&T Electronic Imaging*, SPIE, vol. 5667, pp. 501-512 (2005).

Sharma, "Digital Color Halftones", *Digital Color Imaging Handbook*, Ch. 6, E. (Dec. 2002).

Yang et al., "Light Scattering and Ink Penetration Effects on Tone Reproduction", *Inst. Of Science and Tech.*, Linkping Univ., Sweden, *PICS'* 2000 (Mar. 2000).

Hains, "The Influence of Halftone Orientation on Color Gamut", Recent Progress in Digital Halftoning, IS&T Pub. (1995).

Oztan et al., "Quantitive Evaluation of Misregistration Induced Color Shifts in Color Halftones", Electronic Imaging, vol. 5667, p. 225 (2000).

Yang et al., "Light Scattering and Ink Penetration Effects on Tome Reproduction", Pics 2000: Image Processing, Sys, Conf., Portland, OR, p. 225 (2000).

Arney et al., "Kubelka-Munk Theory and the MTF of Paper", Journ. of Imaging Science and Tech., vol. 47, No. 4, p. 339 (2003).

* cited by examiner

SYSTEM AND METHOD FOR CHARACTERIZING SPATIAL VARIANCE OF COLOR SEPARATION MISREGISTRATION

CROSS-REFERENCE TO RELATED U.S. PATENT APPLICATIONS

The present disclosure is related to U.S. patent application entitled "SYSTEM AND METHOD FOR CHARACTERIZING COLOR SEPARATION MISREGISTRATION", and "SYSTEM AND METHOD FOR HIGH RESOLUTION CHARACTERIZATION OF SPATIAL VARIANCE OF COLOR SEPARATION MISREGISTRATION", both of which are concurrently filed, assigned to the present assignee and hereby incorporated by reference.

BACKGROUND

The present disclosure relates generally to a system and method for color printing. In particular, the present disclosure relates to a system and method for characterizing spatial variance of color separation misregistration.

In multi-color printing systems a limited number of color separations are used for marking a substrate for achieving a wider variety of colors, with each separation marking the substrate using discrete shapes, such as dots having a circular or oval shape, or periodic line patterns. This concept is generally known as color halftoning, and involves combining two or more patterned separations on the substrate. The color separations and halftone design are carefully chosen for achieving a visual effect of the desired color.

Many prior art printing systems use cyan, magenta, yellow and black (also referred to as CMYK) color separations that mark a substrate using discrete cluster dots. In accordance with one prior art method, the dots may be marked in a dot-on-dot fashion, by marking the substrate with a first and second color separation, with the dots of the second color separation superimposed over the dots of the first color separation for achieving the desired color. In accordance with a second prior art method, the dots are applied in a dot-off-dot fashion, with the dots of the second color separation placed in the voids of the dots the first color separation for achieving the desired color. Multi-color printing systems are susceptible to misregistration between color separations due to a variety of mechanical related issues. For both dot-on-dot and dot-off-dot rendering, color separation misregistration may cause a significant color shift in the actual printed color that is noticeable to the human eye.

Another marking method of rotated cluster dot sets is widely used since anomalies (e.g., color shifts) due to color separation misregistrations are subtle and less detectable by the human eye. However, even in these cases color misregistrations can be objectionable, particularly at edges of objects that contain more than one separation. Therefore, it is important to characterize color separation misregistration in order to perform corrective action in the print engine.

Many prior art methods for characterizing misregistration of color separations include using physical registration marks. The registration marks include two fine straight lines, each line formed using a different color separation. The two lines are aligned and joined to form one straight line. Alignment of the two lines is analyzed, with misalignment indicating misregistration of one of the color separations relative to the other. The analysis may include studying the printed registration marks with a microscope and visually determining if misregistration has occurred. Such analysis is tedious and not conducive to automation. The analysis may include imaging the marker with a high resolution scanning device and analyzing the high resolution scanned image using complex software for determining the positions of the registration marks relative to one another. This type of analysis can require expensive high resolution scanning equipment and may involve a significant amount of computational power. Furthermore, this type of processing is prone to error due to even small defects, such as toner splatter.

In another prior art method used for higher end printer devices outputting high volume and/or high quality images, misregistration of color separations is characterized by measuring the transition time between the edges of two primary separation patches (e.g., cyan and magenta) on a moving photoreceptor belt. The patches have angled edges (e.g., chevrons) that allow the determination of misregistration in both the fast scan direction (transverse to the longitudinal axis of the photoreceptor belt) and slow scan direction (parallel to the longitudinal axis of the photoreceptor belt). Simple photo detectors are used to measure the time between the moving edges of the chevrons, and this can in turn be used to compute the misregistration in both slow and fast scan directions. A drawback to this method is the inability to take misregistration measurements across the page, as the photo detectors are present in only two or three locations across the width of the photoreceptor belt. This method of separation misregistration characterization has been designated for use with high end printer systems due to the cost of the photo detectors and associated analysis software.

To overcome the drawbacks in the prior art, it is an aspect of the present disclosure to provide a system and method for characterizing misregistration of color separations using a method that is conducive to real time measurement using low resolution scanning technology.

It is another aspect of the present disclosure to provide a system and method for analyzing a test pattern using simple processing of few elements for minimizing the processing load.

It is another aspect of the present disclosure to print and analyze a test pattern, where the analysis is highly immune to page defects upon which the test pattern is printed.

SUMMARY

The present disclosure is directed to a method for characterizing color separation misregistration of a printer device using color separations of a color space for marking a substrate, the method including receiving for receiving a colorimetric value corresponding to a colorimetric measurement of a marked measurement patch and respective marked calibration patches of a plurality of calibration patches included in an output image output by the printer device. The plurality of calibration patches have a variety of color separation configurations, each color separation configuration using a first and second color separation of the color space, and the marked patch sample has a predetermined color separation configuration. A characteristic of a curve associated with the measured colorimetric values corresponding to the calibration patches is determined. A calibration function is generated based on the determined characteristic of the curve, providing expected colorimetric values for the predetermined color separation configuration as related to a misregistration characteristic value. A misregistration characteristic value is determined from the calibration function that corresponds to the measured colorimetric value of the marked measurement patch for characterizing misregistration between the first and second color separations.

The present disclosure is further directed to a color separation misregistration characterization system. The color separation misregistration system includes a processor for receiving a colorimetric value corresponding to a colorimetric measurement of a marked measurement patch and respective marked calibration patches of a plurality of marked calibration patches included in an output image output by a printer device using color separations of a color space for marking a substrate. The plurality of calibration patches have a variety of color separation configurations, each color separation configuration using a first and second color separation of the color space, and the marked measurement patch has a predetermined color separation configuration. The processor includes a misregistration determination module having a series of programmable instructions executable by the processor for receiving a measured colorimetric value corresponding to respective patches of the plurality of calibration patches and the marked measurement patch.

The misregistration determination module includes a calibration module having a series of programmable instructions executable by the processor for determining a characteristic of a curve associated with the measured colorimetric values corresponding to the respective patches of the plurality of calibration patches, and generating a calibration function based on the determined characteristic of the curve for providing expected colorimetric values for the predetermined color separation configuration as related to a misregistration characteristic value. The misregistration determination module further includes a sample analyzer module having a series of programmable instructions executable by the processor for determining from the calibration function a misregistration characteristic value that corresponds to the measured colorimetric value corresponding to the marked measurement patch for characterizing misregistration of the first color separation relative to the second color separation.

The present disclosure is also directed to a method for characterizing color separation misregistration associated with marking a substrate. The method includes providing an input image having a plurality of calibration patches and a measurement patch, the plurality of calibration patches having a variety of color separation configurations, each color separation configuration using a first and second color separation and the measurement patch having a predetermined color separation configuration; and providing for marking a substrate with a copy of the input image using first and second color separation markings to correspond to the first and second color separations, respectively.

The method further includes providing for measuring color characteristics of respective marked patches of the plurality of calibration patches and the measurement patch and generating corresponding colorimetric values; and providing for determining a characteristic of a curve associated with the generated colorimetric values corresponding to the respective patches of the plurality of marked calibration patches. In addition, the method includes providing for generating a calibration function based on the determined characteristic of the curve for providing colorimetric values expected for the predetermined color separation configuration as related to a misregistration characteristic value; and determining from the calibration function a misregistration characteristic value that corresponds to the generated colorimetric value corresponding to the marked measurement patch for characterizing misregistration of the first color separation relative to the second color separation in the measurement patch.

Other features of the presently disclosed system and method for characterization of color separation misregistration will become apparent from the following detailed description, taken in conjunction with the accompanying drawings, which illustrate, by way of example, the presently disclosed system and method.

BRIEF DESCRIPTION OF THE DRAWINGS

Various embodiments of the present disclosure will be described below with reference to the figures, wherein.

DETAILED DESCRIPTION

Referring now to the drawing figures, in which like references numerals identify identical or corresponding elements, the color separation misregistration characterization (CSMC) system and method in accordance with the present disclosure will now be described in detail. With initial reference to FIG. 1, an exemplary CSMC system in accordance with the present disclosure is illustrated and is designated generally as CSMC system 100. CSMC system 100 includes a printer device 102 and an analysis unit 104. An input image 105 is input to the printer device 102 which marks a substrate with an image that corresponds to the input image 105.

Figure 1:
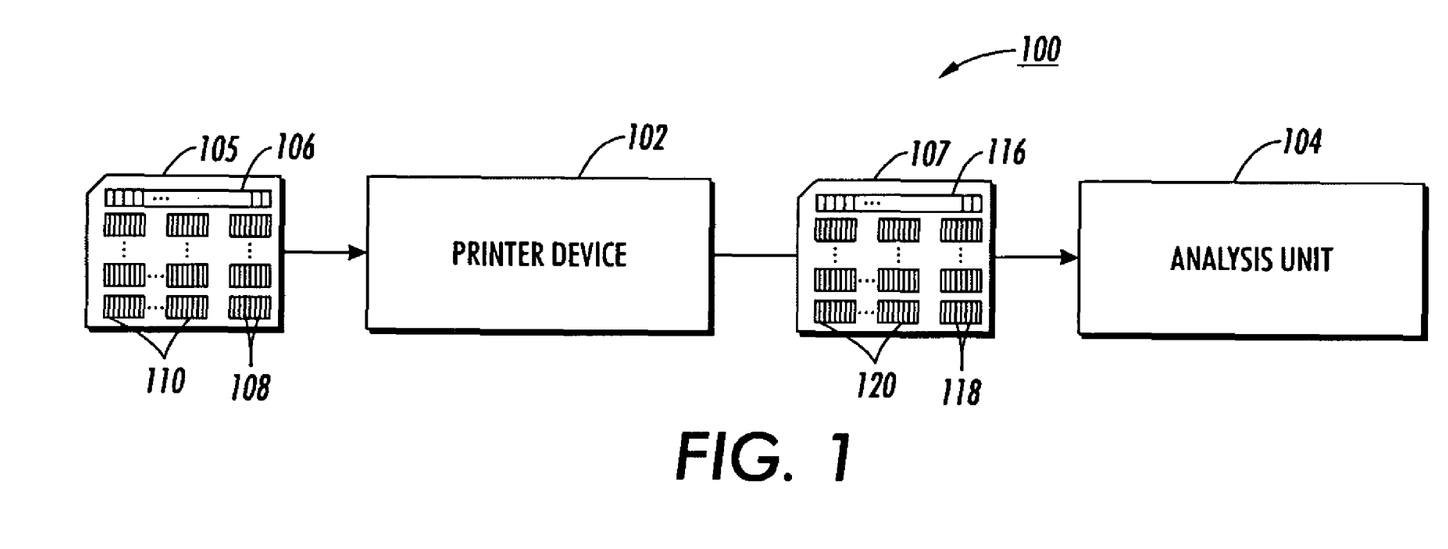
FIG. 1 is a block diagram of an exemplary color separation misregistration characterization system in accordance with the present disclosure.

The input image 105 includes a plurality of calibration patches 106 and a plurality of measurement patches 108, which may be arranged in groups 110. Each of the patches has a color separation configuration, each color separation configuration using a first and second color separation. The plurality of calibration patches 106 have a variety of color separation configurations, and the measurement patch 108 has a predetermined color separation configuration. In the present example, each color separation configuration includes an image line screen having a plurality of parallel lines including respective lines of the first and second color separation, as described further below.

The marked substrate is output as an output image 107 having a plurality of marked calibration patches 116 that corresponds to the plurality of calibration patches 106, and a plurality of marked measurement patches 118 which may be arranged in groups 120 that corresponds to the plurality of measurement patches 108 and the groups 110. The output image 107 is submitted to the analysis unit 104 for analysis of color of the respective marked patches of the plurality of calibration patches 116 and the plurality of marked measurement patches 118.

The term "printer device" as used herein encompasses any apparatus or system, such as a digital copier, xerographic printing system, ink jet printing system, reprographic printing system, bookmaking machine, facsimile machine, multifunction machine, textile marking machine, etc., which performs a marking output function for any purpose. The modality for marking may include, for example, applying toner, ink, dye, etc., to the substrate or embossing, peening, etching, etc., the substrate. The substrate may be a material such as paper, cardboard, a transparency, a paper derivative, metal, plastic, glass, wood, cloth, etc. The substrate may also be a photoreceptor belt, upon which toner is deposited during xerographic development. For example, real-time misregistration characterization may be performed by providing a spectrophotometer or scanner bar with analysis unit 104 which measures a color characteristic of the photoreceptor belt as it passes by.

A characteristic of the color of the plurality of marked calibration patches 116 is measured for establishing at least one calibration function, which may be represented as a model function, curve, data structure, look-up-table (LUT) or the equivalent, associated with respective color separation pairs. A characteristic of the color of the marked measurement patches 118 is measured, and used to determine relative misregistration between color separations of the respective color separation pairs by accessing the function in accordance with the color characteristic measurements of the marked measurement patches 118. The relative misregistration is characterized for the slow and fast scan directions. Once the color separation misregistration is characterized, steps may be taken to correct the misregistration. Correction of the color separation misregistration is beyond the scope of the present disclosure.

Figure 2:
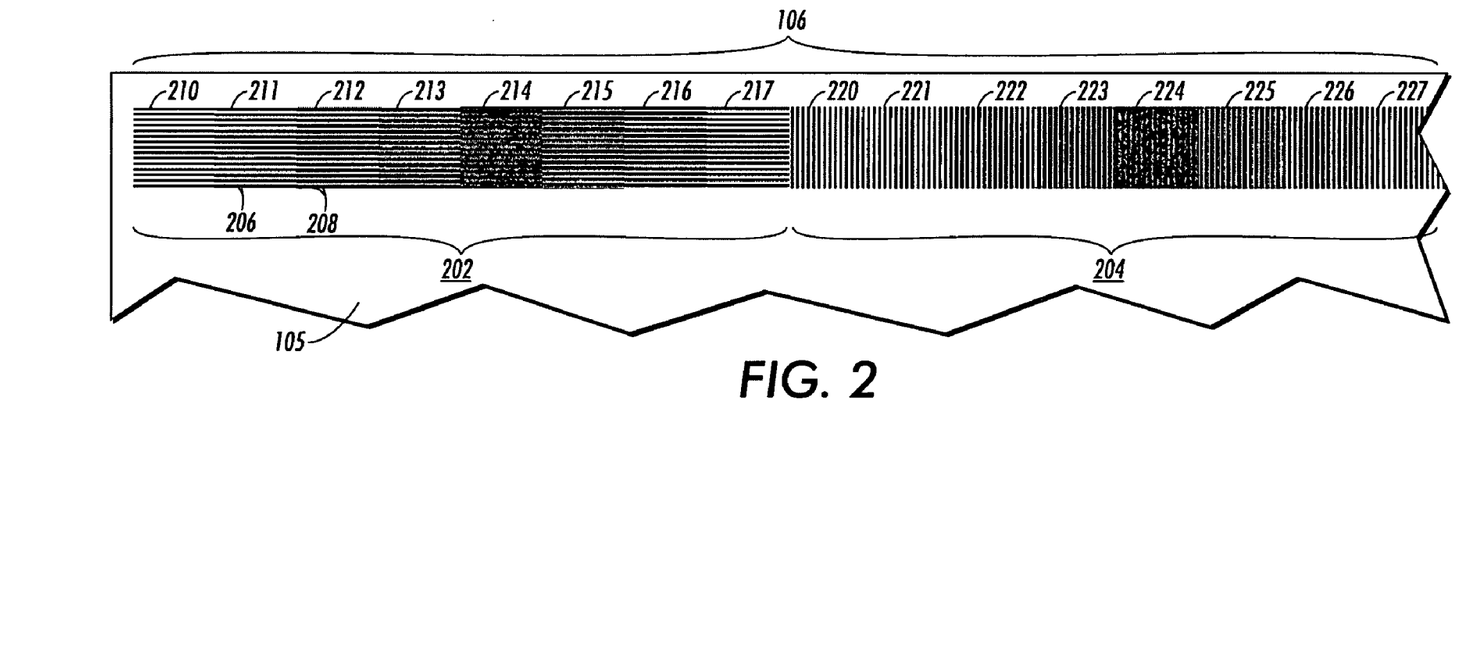
FIG. 2 is a diagram of a portion of an image input to a printer device of the system shown in FIG. 1.

FIG. 2 shows a portion of input image 105 upon which a portion of the plurality of calibration patches 106 are shown in greater detail. The calibration patches 106 are shown positioned at the top of a substrate upon which the input image 105 is provided, but positioning of the calibration patches 106 is not limited to a particular position. The plurality of calibration patches 106 of the input image 105 includes a first series of patches 202 and a second series of patches 204 for each of at least one color separation pair. In the first series 202, each patch is shown to include an image line screen having a plurality of parallel lines, including lines of a first color separation 206 (such as cyan, shown as the lighter shaded lines 206) and lines formed of a second color separation 208 (such as magenta, shown as the darker shaded lines 208).

The first series 202 includes eight patches numbered 210-217 having a first line screen orientation, with the lines shown oriented at a first angle relative to the horizontal, where in the present example the first angle is 0° and the first line screen orientation is 0°. The first patch 210 uses a line-on-line rendering, and the fifth patch 214 uses a line-off-line rendering. Line-on-line refers to lines of a first color separation superimposed over the lines of a second color separation for achieving a desired color, similar to dot-on-dot, and line-off-line refers to the lines of a first color separation placed in the voids of the lines of a second color separation for achieving a desired color, similar to dot-off-dot. In the present example there are no voids between the lines of the first and second color separation in the line-off-line rendering.

The lines 208 remain in a fixed position in all of the patches 210-217. For patches 211-217, the lines 206 are translated or displaced by an incremental amount relative to the previous patch in a horizontal direction. The displacement of lines of the first color separation (lines 206 in the present example) relative to lines of the second color separation (lines 208 in the present example) is also referred to as phase shift or screen displacement. As the lines 206 are translated incrementally relative to lines 208 in each subsequent patch of the series 202 referred to as incremental screen displacement, the line-on-line pattern of patch 210 transitions gradually to the line-off-line pattern of patch 214, and then gradually towards a line-on-line rendering again in patches 215-217, completing a full cycle or halftone period.

In the example shown, the translation increment is ¼ the width of the lines 206 and 208 (all having an equal width that is half the width of the line-screen period). The transition from patch 210 to 217 represents a full halftone period, with each of the eight patches 210-217 representing a ⅛ halftone period. The color characteristics of the patches 211-217 change due to the different overlap of lines 206 relative to 208. For example, the fifth patch 214 in which the lines are rendered line-off-line has the greatest chroma, which refers here to the degree of colorfulness. The change in color characteristics (e.g., chroma) is measurable. Likewise, differences in lightness (luminance) between these patches are also measurable.

The second series 204 is shown to include eight patches numbered 220-227 having a second line screen orientation, with the lines 206 and 208 oriented at a second angle relative to the horizontal, where in the present example the second angle is 90° and the second line screen orientation is 90°. The first patch 220 uses a line-on-line rendering, and the fifth patch 224 uses a line-off-line rendering. As in the first series 202, the lines 208 of the second series 204 remain in a fixed position as the lines 206 are incrementally translated in a direction that is perpendicular to the orientation of the lines 206 and 208. As the lines 206 are translated incrementally in each subsequent patch, the line-on-line pattern of patch 220 transitions gradually to the line-off-line pattern of patch 224 and then gradually towards a line-on-line rendering again in patches 225-227. As for the first series of patches 202, one or more color characteristics (chroma or lightness (luminance)) of the patches 220-227 are measurable.

The printer device 102 receives the input image 105 and outputs output image 107. The input image 105 may be received as a digital file in a printer ready language, often referred to as a page description language, such as PostScript™, PDF™, or PCL™. The digital file may be received by the printer device 102 via a job request from a remote or local device, such as a computer terminal or scanner (not shown), or by scanning in a document having a plurality of patches printed thereon. In the latter case, the scanning is performed by positioning the document on a scanner plate or platen glass of the printer device 102, and the document is scanned in by a scanner integrated with the printer device 102.

The printer device 102 marks a substrate in accordance with the input image 105 generating the output image 107. The patches of the input image 105 are in the form of binary lineart and do not require further halftoning. When color separation registration of the printer device 102 is ideal (e.g., no color separation misregistration), the output image 107 is substantially identical to the input image 105, and the color characteristics of the patches of the output image 107 are substantially identical to the color characteristics of the patches of the input image 105.

Figure 3:
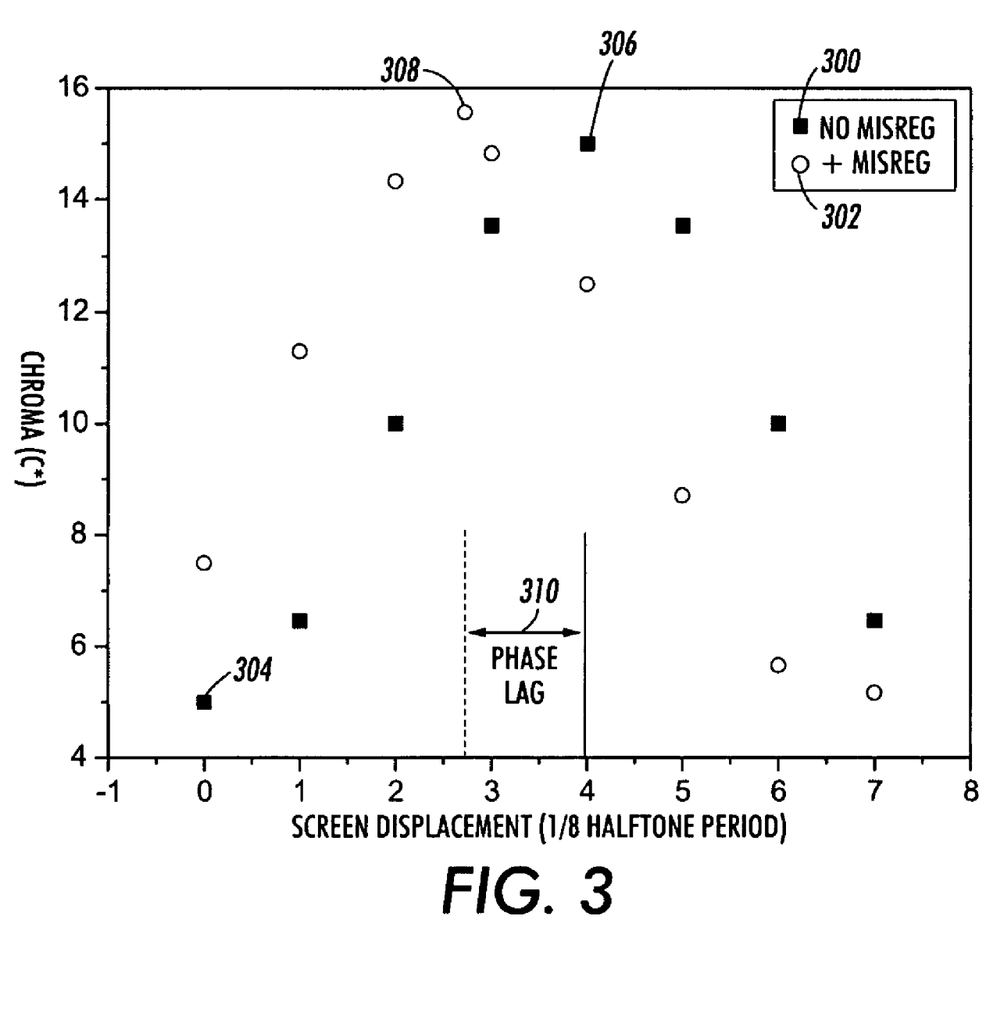
FIG. 3 is a plot of measured chroma for a series of patches of an image output by the printer device of the system shown in FIG. 1, and a plot of expected chroma for a theoretical image output by a printer device in which color separation registration is ideal.

For illustrative purposes, FIG. 3 shows a plot illustrating the effect of chroma measurement for a series of patches that are printed with color separation misregistration and for a series of patches that are printed with no color separation misregistration. The points of curve 300 correspond to chroma measurements taken for a series of patches such series 202, where the patches are printed with color misregistration. The points of curve 302 correspond to chroma measurements expected for the same series of patches as curve 300, but where the patches are printed with ideal color registration, i.e., no color misregistration. The curve 300 is sinusoidal, with a minimum point designated by reference numeral 304. The minimum point 304 corresponds to a minimum chroma intensity measurement expected for the patch corresponding to zero displacement in which a line-on-line pattern is printed.

The sinusoidal curve 300 has a peak designated by reference numeral 306. The peak 306 corresponds to a maximum chroma intensity measurement expected for the patch corresponding to the 4/8 halftone period screen displacement in which a line-off-line pattern is printed. The curve 302 is also sinusoidal, however once the curve is fit to the measured points it can be determined that the peak of the fit curve occurs somewhere between patches corresponding to the 2/8 and 3/8 halftone period screen displacements, designated by reference numeral 308. The offset of the peak of curve 302 relative to the peak of curve 304, referred to as phase lag and designated by reference numeral 310, indicates the amount by which the curves 300 and 302 are out of phase. The phase lag is indicative of the degree and direction of relative misregistration between the two color separations used for patches 210-217 and 220-227 (cyan and magenta in the present example).

Figure 4:
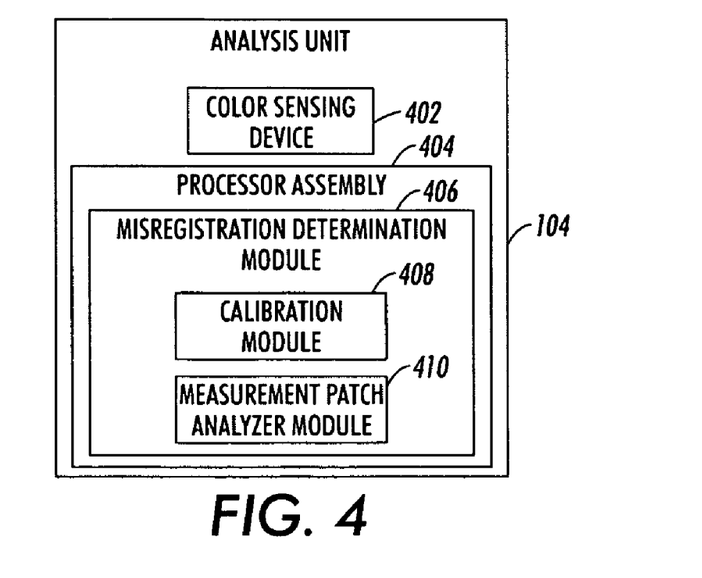
FIG. 4 is an embodiment of an analysis unit of the system shown in FIG. 1.

Measurements of the color characteristics and analysis of the measurements for characterizing color separation misregistration are performed by the analysis unit 104. FIG. 4 shows one embodiment of the analysis unit 104, where the analysis unit 104 includes a color sensing device 402 that measures at least one characteristic of color of the color patches 108. The color sensing device 402 may include an illumination device having at least one light source, an aperture through which reflected light (ambient light and/or light generated by the at least one light source) enters, and an array of photo detectors for sensing light having entered through the aperture and outputting a signal indicative of at least one color characteristic. The output signal may have a property (e.g., a magnitude) that is indicative of an average value of the output by the photo detectors of the array. One example of a color sensing device 402 is a spectrophotometer.

The color sensing device 402 may be a handheld device which a user physically holds and moves over the output image 107 for scanning the output image 107. Alternatively, the color sensing device 402 may be a non-portable device which receives the output image 107 and automatically scans the output image 107. The color sensing device 402 outputs an analog or digital signal. If the signal is analog, it is converted to a digital signal. The analog-to-digital conversion may be performed by analog-to-digital converter (ADC) circuitry integrated with the color sensing device 402 or external from the color sensing device 402. The digital signal includes a colorimetric quantity that is indicative of results of the color measurements sensed by the color sensing device 402, such as luminance, reflectance, chroma, or a combination thereof. The color measurement may include measurements of human-visual color values such as CIE L*a*b*, XYZ, or non-human-visual color values, such as RGB and CMYK, or a combination thereof. For example, the colorimetric values may include an average color value for each patch, a color value for one or more samples (e.g., dots, portions or small areas, etc.) of each respective patch, or a function of multiple samples for each respective patch.

The colorimetric value may be expressed using a model, such as the Lab Color Model (lightness (luminance), a* and b*), as is known in the art for describing color in three dimensions, on x, y and z axes. The z (vertical) axis corresponding to lightness (luminance), and the x and y axes corresponding to the a* and b* channel, with the a* channel representing color transitions between red and green, and the b* channel representing color transitions between blue and yellow. The color value may be expressed in terms of luminance only, in terms of chroma only or a combination thereof. In accordance with the CIE L*a*b* model, the chroma corresponds to the a* and b* channels only, where the chroma magnitude corresponds to the radius of a vector in the a*b* plane (which is sometimes referred to as c*). Other models or methods may be used for describing color characteristics, such as in terms of RGB (red-green-blue) or CMYK (cyan-magenta-yellow-black) color spaces.

The measured colorimetric values output by the color sensing device 402 are provided to a processor assembly 404 having at least one processor. A misregistration determination module 406 executable on the at least one processor receives the measured colorimetric values. The misregistration determination module 406 includes a calibration module 408 and a measurement patch analyzer module 410. Each software module, including the misregistration determination module 406 and its calibration module 408 and measurement patch analyzer module 410, includes a series of programmable instructions capable of being executed by the processor assembly 404. The series of programmable instructions can be stored on a computer-readable medium, such as RAM, a hard drive, CD, smart card, 3.5" diskette, etc., or transmitted via propagated signals for being executed by the processor assembly 404 for performing the functions disclosed herein and to achieve a technical effect in accordance with the disclosure. The functions of the respective software modules may be combined into one module or distributed among a different combination of modules.

The calibration module 408 fits the measured colorimetric values corresponding to each series of patches of the plurality of calibration patches 116 to respective curves, where each series of patches corresponds to a respective color separation pair and line screen orientation. For each fit curve, the calibration module 408 then determines the maximum and minimum (peak-to-peak) colorimetric values by determining each high and low peak and determining the respective magnitudes of the high and low peaks. For a somewhat courser approach which involves less processing, the peak-to-peak colorimetric values corresponding to each series may be determined directly from the measurements, thus skipping the step of fitting a curve to the measured points.

Figure 5:
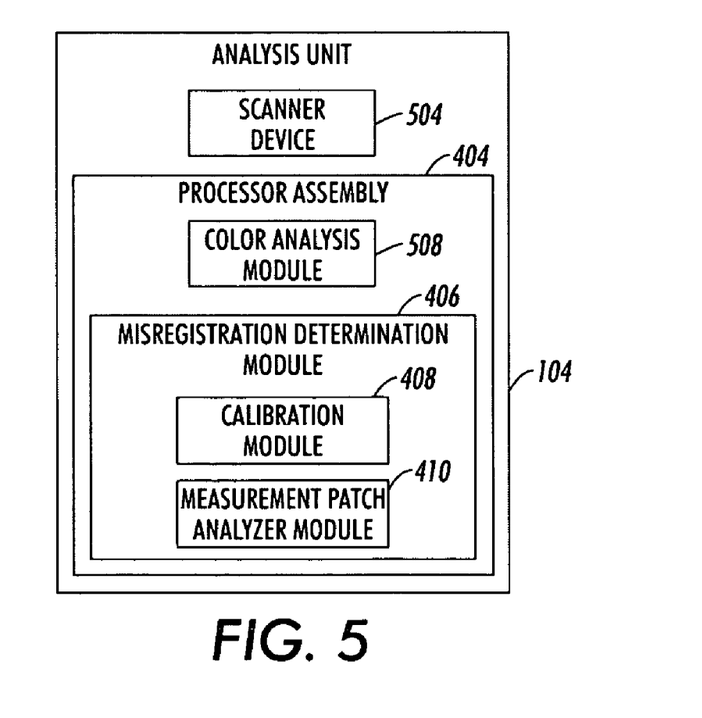
FIG. 5 is another embodiment of the analysis unit of the system shown in FIG. 1.

In another embodiment of the analysis unit 104 shown in FIG. 5, a scanner device 504 is provided instead of the color sensing device 402. The output from the scanner device 504 is provided to the processor assembly 404. A color analysis module 508 executable on the processor assembly 404 receives and analyzes the output from the scanner device 504 for generating colorimetric measurement values associated with marked patches of the output image 107 being measured. As in the embodiment shown in FIG. 4, the misregistration determination module 406 receives the output colorimetric values. The calibration module 408 receives the colorimetric measurements associated with each series of patches of the marked plurality of calibration patches 116 and fits the received colorimetric measurements corresponding to each series of patches of the plurality of calibration patches 116 to a respective curve. The calibration module 408 then determines the maximum and minimum colorimetric value for each series of patches by determining the magnitude of the high and low peaks of the corresponding fit curve. The step of fitting the curve may be omitted and the maximum and minimum colorimetric values may be determined directly from the measurements, skipping the step of fitting a curve to the measured points.

In accordance with the current example, the maximum and minimum colorimetric values are determined for marked patches of the plurality of patches 116 that correspond to the first series of patches 202 having a 0° line screen orientation for a first color separation pair. Next, the maximum and minimum colorimetric values are determined for marked patches of the plurality of patches 116 that correspond to the second series of patches 204 having a 90° line screen orientation for the first color separation pair. The maximum and minimum colorimetric values are determined for the remainder of the plurality of calibration patches 116, including the first and second series of patches having the first and second line screen orientations, respectively, which are associated with each respective color separation pair for which calibration is being performed.

The plurality of marked calibration patches 116 may include a first and second series of patches for other color separation pairs so that maximum and minimum colorimetric values may be determined for a first and second line screen orientation associated with each color separation pair. The maximum and minimum colorimetric values are used for the purpose of generating an associated calibration function, which may be represented, as described above, as a model function, curve, data structure, LUT or the equivalent. Misregistration in the slow and fast scan directions is determined by analyzing marked measurement patches 118 having first and second line screen orientations associated with the respective color separation pairs.

For a CMYK color separation scheme there are six pairs of color separations which may be analyzed in order to analyze all of the relative color misregistration. It is possible to analyze three color separation pairs by taking colorimetric measurements, determining maximum and minimum colorimetric values, generating associated calibration functions and determining relative misregistration based on the calibration functions for each of the three color separation pairs. The relative registration of the other three color separation pairs may be derived from the results of the analysis of the former three color separation pairs. The user may be most interested in analyzing misregistration of color pairs that have the strongest visual impact due to a large variety in chroma, namely selected from CK, MK, YK and/or CM.

The number of patches used per halftone period of the first and second series of patches for each color separation pair is not limited to the eight patches shown in the present example. A greater or lesser number of patches per each of the series may be used, and a greater or lesser amount of phase shift may be used between consecutive patches. For each first and second series of patches corresponding to a color separation pair, first and second line screen orientations are different, where the difference therebetween is not an integer multiple of 180°. In the present example, the difference between the first and second line screen orientations is 90°, however is not limited thereto. The first and second line screen orientations are not limited to 0° or 90° as demonstrated in the example above. For example, the respective line screen orientations may be 45° and 135°, and generation of the calibration function and/or calculation of misregistration in the slow and fast directions may be determined by performing a rotation operation. Performance of rotation operations is described in concurrently filed U.S. patent application entitled "SYSTEM AND METHOD FOR CHARACTERIZING COLOR SEPARATION MISREGISTRATION".

In accordance with the present example, the exemplary plurality of calibration patches 106 includes a first and second patch series for each of three color separation pairs of the CMYK color space being analyzed for misregistration. Each patch series includes eight patches, totaling 16 patches for each color separation pair of three respective color separation pairs, so that the total number of patches is 48. The size of the respective patches is in accordance with design choice. It is preferable to position the patches in close proximity to one another in order to reduce error, as the misregistration may actually change over the distance of the block of patches. The plurality of calibration patches 106 are positioned in a single row that is positioned near the top edge of the substrate. Misregistration of the other three color separation pairs of the CMYK color space are derived from the three color separation pairs analyzed above.

In accordance with the present example, the maximum and minimum colorimetric values for the plurality of marked patches 116 having the 0° orientation is used to generate a calibration curve for determining color separation misregistration for the cyan/magenta color separation pair in the slow scan direction. The maximum and minimum colorimetric values for the plurality of marked patches 116 having the 90° orientation is used to generate a calibration curve for determining color separation misregistration for the cyan/magenta color separation pair in the fast scan direction.

Generation of the calibration function corresponding to each color separation pair using the determined maximum and minimum colorimetric values is now described. The calibration function may be represented or created using a model function describing the colorimetric values (e.g., the $L^*a^*b^*$) as related to (e.g., a function of) a misregistration characteristic value indicative of misregistration. The model function is generally a simple sinusoidal function, although it can be more complex in nature. Fundamentally, the function must be periodic with respect to the halftone line screen period.

The determined maximum colorimetric value corresponds to the actual screen displacement, even with misregistration, that is line-off-line, and the determined minimum colorimetric value corresponds to the actual screen displacement, even with misregistration, that is line-on-line. A patch having a screen displacement that is actually midway between line-off-line and line-on-line would have a predictable associated colorimetric value based on the determined maximum and minimum colorimetric values. In a printer device 102 in which registration is ideal (i.e., no misregistration), the minimum colorimetric value corresponds to the ⁰⁄₈ halftone period (in-phase) and the maximum colorimetric value corresponds to the ⁴⁄₈ halftone period (½ period out of phase).

The patch which is midway between line-on-line and line-off-line screen displacement corresponds to the ²⁄₈ halftone period (¼ period out of phase) and will correspond to a colorimetric value that is somewhere between the maximum and minimum colorimetric values (also referred to as the midway value), with a predictable value determined by the calibration function. When misregistration exists, the colorimetric value measured for a patch that is ¼ period out of phase will not equal the midway value. The amount that the measured colorimetric value is above or below the midway value is indicative of the degree and direction of relative misregistration between the color separations of the color separation pair.

Accordingly, the maximum and minimum colorimetric values are used to determine an expected midway value. A calibration function is generated describing colorimetric values for a patch that is ¼ period out of phase as a function of the misregistration characteristic value (e.g., described in terms of degree and direction). The marked measurement patches 118 each correspond to a color separation pair and are ¼ period out of phase. The measured colorimetric value corresponding to a respective marked measurement patches 118 is used as an index to look up the corresponding misregistration characteristic value via the calibration function for determining the color separation misregistration of the measured marked measurement patch 118.

Figure 6:
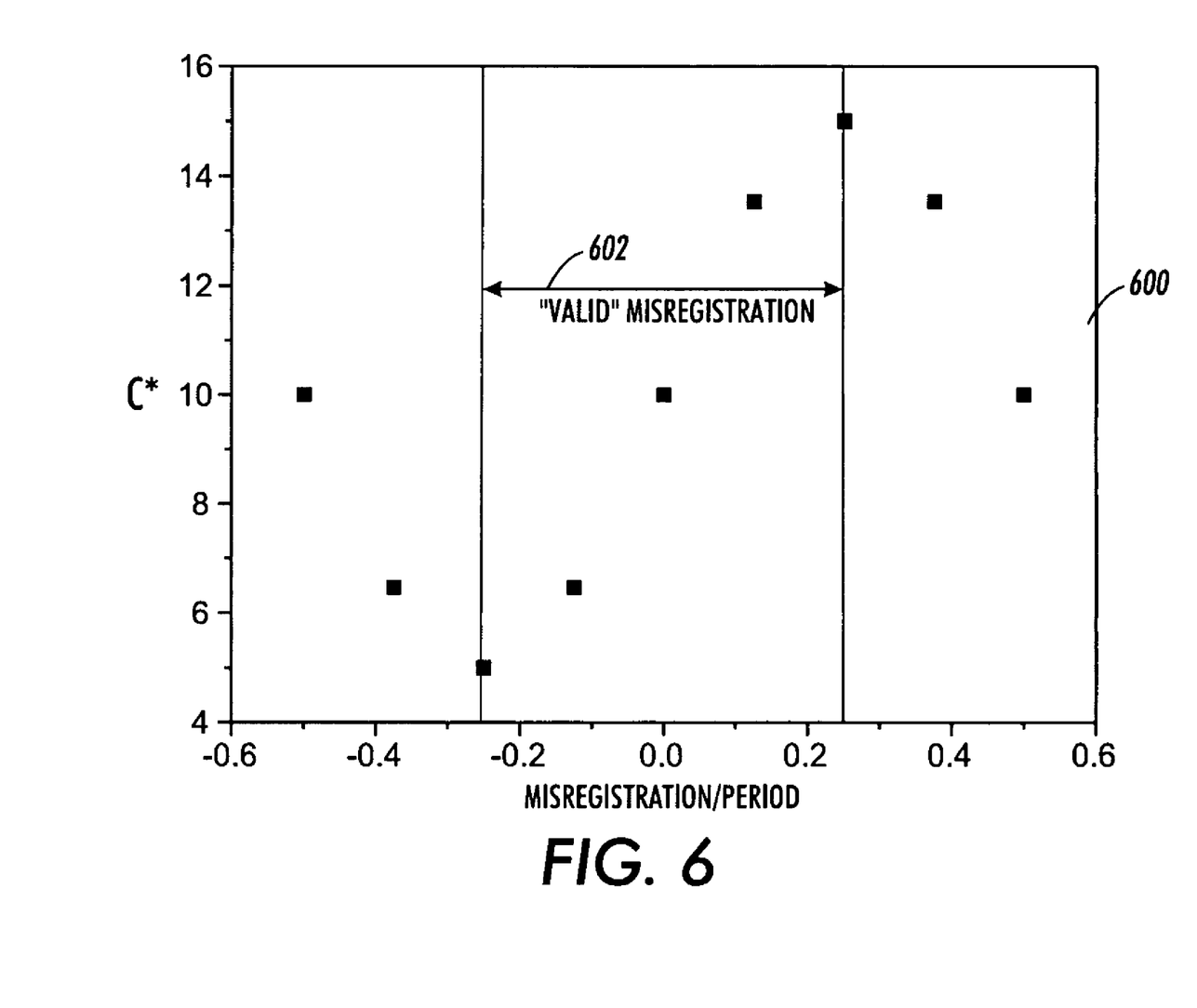
FIG. 6 shows a theoretical curve for a measured colorimetric value as related to a misregistration characteristic value for a measurement patch.

FIG. 6 shows a theoretical curve 600 for c* (chroma) as a function of the misregistration characteristic value for a marked measurement patch 118 for a color separation pair in which the line screen is ¼ period out of phase. For each c* value there is a corresponding unique misregistration per period value (e.g., where misregistration is the relative misregistration between the color separations of the color separation pair) for misregistration per period falling within the range [−T/4, T/4] designated by reference number 602, where T is the line screen period. Outside of the above range, aliasing may occur and a unique misregistration value may not be identifiable.

If misregistration perpendicular to the parallel lines of line screen of the marked measurement patch 118 is introduced, it will have the effect of shifting the c* value higher or lower, depending on the misregistration direction. The c* value for the marked measurement patches 118 is measured and used to look up the corresponding misregistration degree and direction using the calibration function.

In operation, the measurement patch analyzer module 410 analyzes the measured colorimetric values associated with the marked measurement patches 118. Each marked measurement patch 118 is a marked copy of a marked measurement patch 118 of the input image 105 including a line screen having one of a first and second line screen orientation, where the marking uses a color separation pair. Analysis of the marked measurement patches 118 by the measurement patch analyzer module 410 includes characterizing the relative misregistration between the color separations of the color separation pair using the calibration function generated for the color separation pair.

The measurement patches 108 of the input image 105 are provided in groups 110, with each group 110 including a pair of measurement patches for each color separation pair being analyzed, with a first measurement patch 108 of each pair having a first line screen orientation (0° in the present example), and a second measurement patch 108 of the pair having a second line screen orientation (90° in the present example). The difference between the first and second line screen orientations is not an integer multiple of 180°. The first and second line screen orientations of the measurement patches 108 may be the same as the first and second line screen orientations of the calibration patches 106, but are not limited thereto.

Furthermore, if line screen orientations other than 0° and 90° are used for the plurality of calibration patches 106 or the measurement patches 108, rotation operations are performed for determining misregistration in the fast and slow directions for each color separation pair. As described above, performance of rotation operations is described in concurrently filed U.S. patent application entitled "SYSTEM AND METHOD FOR CHARACTERIZING COLOR SEPARATION MISREGISTRATION".

In the present example, each group 110 of measurement patches 108 includes a pair of measurement patches 108 corresponding to each of the three respective color separation pairs for which a calibration curve was generated. Misregistration is determined from the corresponding marked measurement patches 118 using the appropriate calibration curve. Misregistration for the other three color separation pairs is derived using the determined misregistration information.

Each measurement patch 108 of the input image 105 is a single patch having a line screen corresponding to an n/8 halftone period screen displacement for a color separation pair, for 1≦n≦7 and n≠4, where in the present example, n=3 or 7. The lines of a first color of the color separation pair corresponding to the measurement patch 108 are a known period out of phase with the lines of a second color of the color separation pair. In the present example the known period is ¼ period, which is the midpoint between line-on-line and line-off-line. As the relationship between the known period and the in-phase and out-of-phase periods is known, the calibration functions are generated using the known information. For example, the calibration functions may be generated with colorimetric values corresponding to a ⅛ period provided as a function of misregistration and based on the determined maximum (max) and minimum (min) colorimetric values. The description above pertains to a period having eight patches with varying screen displacements, however, the disclosure is not limited thereto. Regardless of the number of patches per period, the calibration functions are generated for the known period using the determined maximum and minimum colorimetric values. The measurement patches 108 have line screens that correspond to the known period.

The measured colorimetric value for each marked measurement patch 118 is used as an index to look up the corresponding misregistration characteristic value using the calibration function that corresponds to the color separation pair and line screen orientation of the marked measurement patch 118. When the calibration function is represented as a data structure, such as LUT, interpolation may be used in accordance with an appropriate function, generally sinusoidal in nature or an approximation thereof, for measured colorimetric values that lie between values provided in the LUT. For each color separation pair, the misregistration information obtained from the associated calibration function is used to characterize the misregistration in the fast and slow directions.

In the present example, each group 110 of measurement patches 108 includes a pair of measurement patches having the first and second line screen orientations for each of three color separation pairs. Accordingly, each group 110 includes six measurement patches 108. A plurality of measurement patch groups 110 may be distributed at different locations of the input image 105. Since only six measurement patches are used for each group 110 the groups 110 may be closely spaced to one another for achieving a high spatial resolution. Accordingly, misregistration of the output image 107 may be characterized with a high degree of spatial resolution.

In accordance with the present disclosure the procedure the misregistration is characterized by taking colorimetric measurements of the calibration patches 116 and marked measurement patches 118. Colorimetric measurements are relatively simple to obtain and use in computations. Furthermore, low resolution scanning may be used for generating the colorimetric values, allowing for the use of lower resolution and less expensive scanning equipment and simpler processing than is used for prior art color separation misregistration detection methods.

Figure 7:
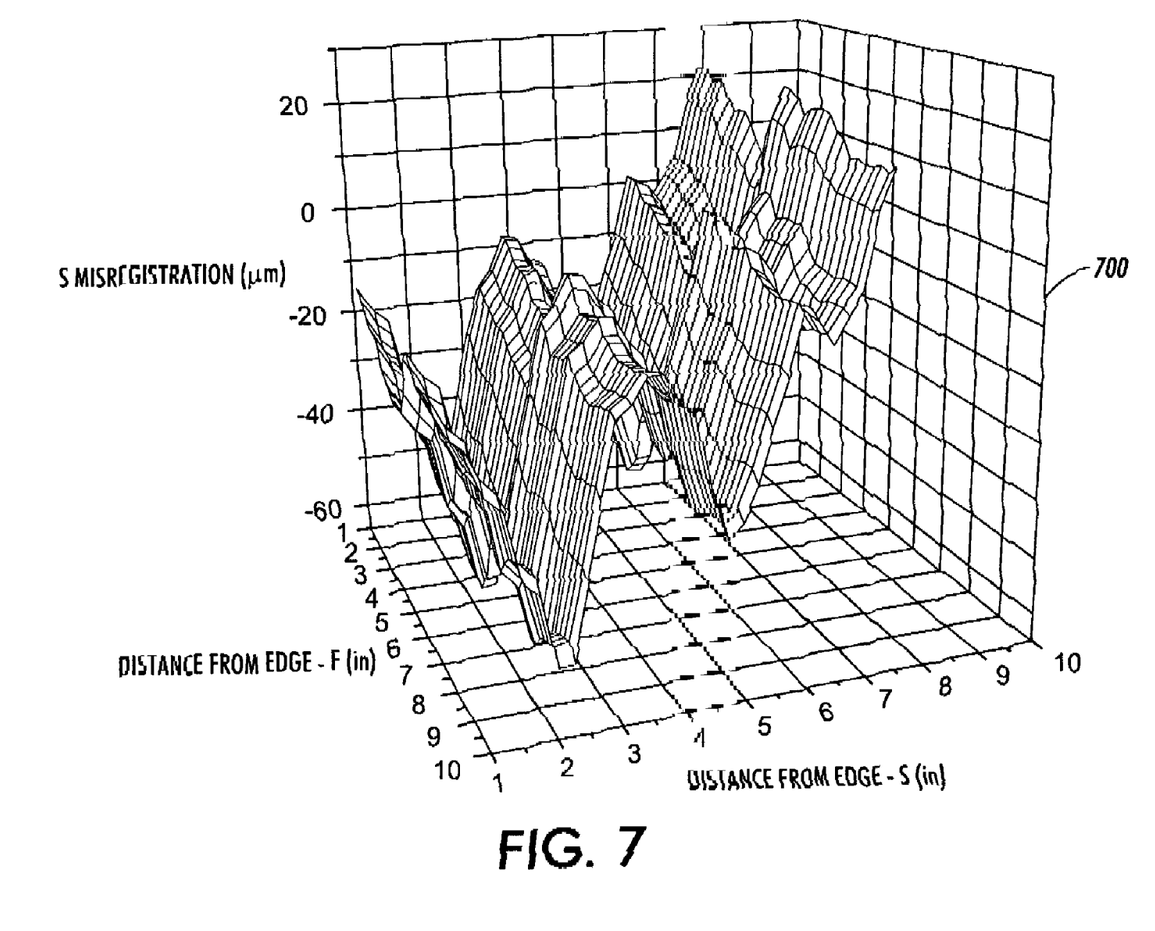
FIG. 7 shows a plot of data for relative misregistration in the slow scan direction between cyan and magenta color separations.

FIG. 7 shows a plot 700 of relative misregistration of output image 107 between cyan and magenta color separations in the slow scan (S) direction as a function of position on a substrate marked with the output image 107 relative to a first edge (S, which refers to the horizontally oriented edge) and a second edge (F, which refers to the vertically oriented edge). As shown, the spatial variations in misregistration between the two color separations in a particular scan direction may be measured in terms of spatial variations across the substrate with fairly high granularity. The measurement patches of the input patches 108 use a 75 dpi line screen, implying that misregistration in the range of ±84 μm can be estimated without aliasing.

In an analogous fashion, the misregistration between the other color separation pairs may be characterized by measuring similar measurement patches involving those separations. To determine the misregistration of C, M, Y relative to K at a particular spatial location on the page, one would need to print and measure a total of six patches (e.g., CK, MK, YK for both 0 and 90 degrees). The line screen frequency may be selected in accordance with the desired result, where the higher the line screen frequency, the more precise color precision is produced, and the lower the frequency, the greater the range of misregistration predictability.

Figure 8:
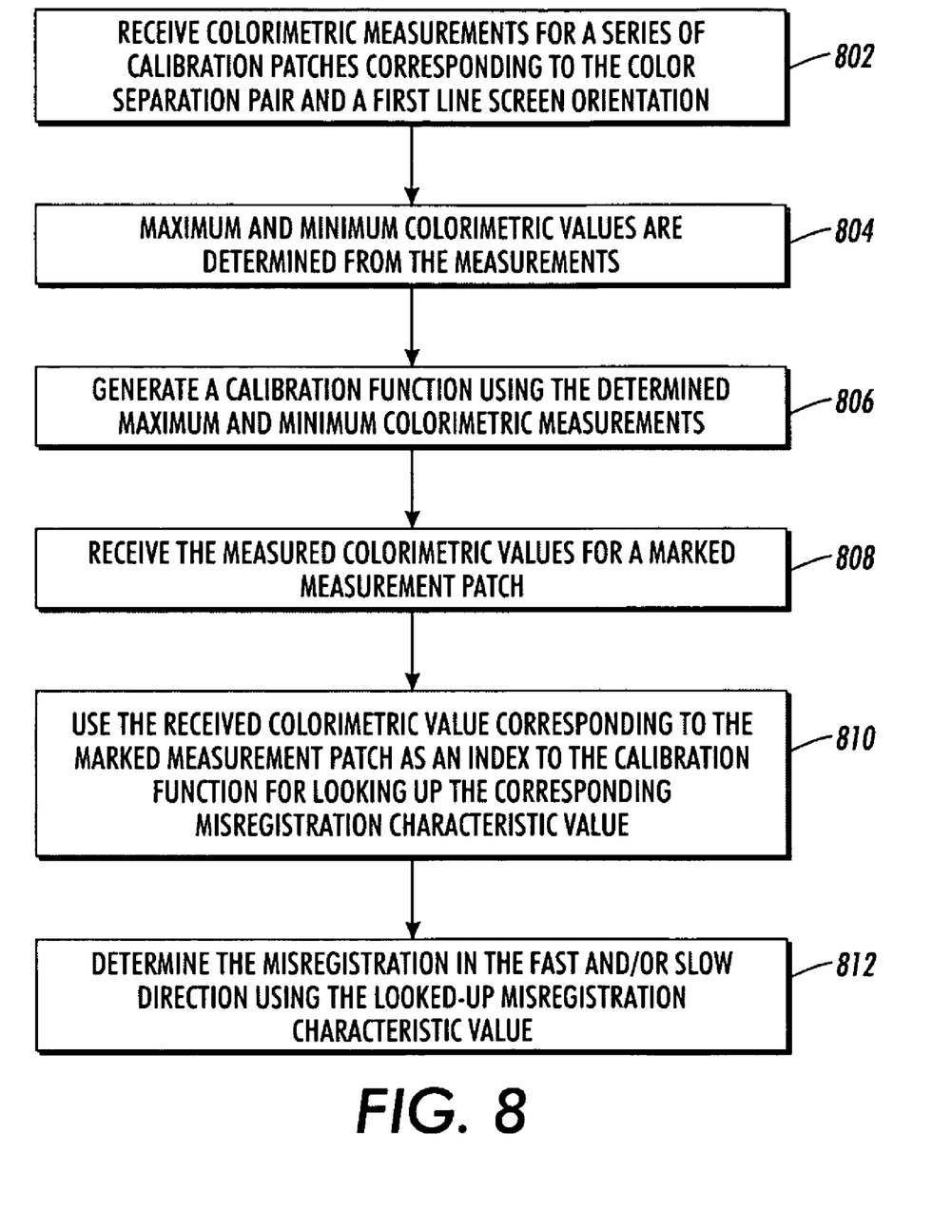
FIG. 8 is flowchart of steps performed by the misregistration determination module of the exemplary embodiments of the analysis units shown in FIGS. 4 and 5.

FIG. 8 shows a flowchart of steps performed by the misregistration determination module 406 for characterizing misregistration of a color separation pair in a first scan direction (fast or slow). At step 802, colorimetric measurements are received for a series of calibration patches corresponding to the color separation pair and a first line screen orientation. At step 804, maximum and minimum colorimetric values are determined from the measurements. This step may include fitting the received colorimetric measurement values to a curve and finding the high and low peaks of the fitted curve.

At step 806, a calibration function is generated using the determined maximum and minimum colorimetric measurements, where the calibration function describes colorimetric measurements for a line screen having a known screen displacement in-phase and out-of-phase as a function of the misregistration characteristic value. The calibration function may be generated using a model function, such as a sinusoidal function, or may be determined empirically.

At step 808, the measured colorimetric value for a marked measurement patch 118 is received. This step may occur earlier in the procedure, such as concurrent with step 802. At step 810, the received colorimetric value corresponding to the marked measurement patch 118 is used as an index to the calibration function for looking up the corresponding misregistration characteristic value. At step 812, the misregistration in the fast and/or slow direction is determined using the looked-up misregistration characteristic value, which may include performing a rotation procedure using a looked-up result that corresponds to color separation pair and a second line screen orientation, where the difference between the first and second line screen orientations is not a multiple of 180°.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for characterizing color separation misregistration of a printer device using color separations of a color space for marking a substrate, comprising:

receiving a colorimetric value corresponding to a colorimetric measurement of a marked measurement patch and respective marked calibration patches of a plurality of calibration patches included in an output image output by the printer device, the plurality of calibration patches having a variety of color separation configurations, each color separation configuration using a first and second color separation of the color space, the marked measurement patch having a single predetermined color separation configuration;

determining a characteristic of a curve associated with the measured colorimetric values corresponding to the respective patches of the plurality of calibration patches;

generating a calibration function based on the determined characteristic of the curve for providing expected colorimetric values for the predetermined color separation configuration as related to a misregistration characteristic value; and determining from the calibration function a misregistration characteristic value that corresponds to the measured colorimetric value corresponding to the marked measurement patch for characterizing misregistration of the first color separation relative to the second color separation; and wherein each color separation configuration includes an image line screen having a plurality of parallel lines including respective lines of the first and second color separation;

wherein the plurality of calibration patches includes a first and second series of patches, wherein for each of the respective first and second series of patches, the lines of the first color separation for each respective patch have different incremental screen displacements relative to the lines of the second color separation; and wherein:

the parallel lines of the second patch series are oriented at an angle relative to the parallel lines of the first patch series, where the angle is not an integer multiple of 180 degrees;

the measurement patch includes a first and second measurement patch, wherein the parallel lines of the second measurement patch are oriented at an angle relative to the parallel line of the second measurement patch, where the angle is not an integer multiple of 180 degrees;

the step of determining the characteristic of the curve includes determining the characteristic of the curve associated with the measured colorimetric values corresponding to each of the respective first and second series of patches; and the step of generating the calibration function includes generating a first and second calibration function based on the determined characteristic of the curve corresponding to the first and second series of patches, respectively.

2. The method according to claim 1, wherein each of the respective first and second patch series includes a patch in which the lines of the first and second color separations are in a line-off-line configuration relative to one another and another patch in which the lines of the first and second color separations are in a line-on-line configuration relative to one another.

3. The method according to claim 1, wherein the predetermined screen displacement is ¼ period.

4. The method according to claim 1, wherein the calibration function corresponds to a sinusoidal function.

5. The method according to claim 1, wherein the step of determining the characteristic of the curve further comprises determining a maximum and minimum colorimetric value corresponding to each of the respective first and second series of the plurality of calibration patches.

6. The method according to claim 5, wherein an expected colorimetric value from the expected colorimetric values corresponding to a misregistration characteristic value indicative of no misregistration is midway between the determined maximum and minimum colorimetric values.

7. A color separation misregistration characterization system, comprising:
- a processor for receiving a colorimetric value corresponding to a colorimetric measurement of a marked measurement patch and respective marked calibration patches of a plurality of marked calibration patches included in an output image output by a printer device using color separations of a color space for marking a substrate, the plurality of calibration patches having a variety of color separation configurations, each color separation configuration using a first and second color separation of the color space, the marked measurement patch having a single predetermined color separation configuration;
- the processor comprising:
  - a calibration module having a series of programmable instructions executable by the processor for determining a characteristic of a curve associated with the measured colorimetric values corresponding to the respective patches of the plurality of calibration patches, and generating a calibration function based on the determined characteristic of the curve for providing expected colorimetric values for the predetermined color separation configuration as related to a misregistration characteristic value; and
  - a sample analyzer module having a series of programmable instructions executable by the processor for determining from the calibration function a misregistration characteristic value that corresponds to the measured colorimetric value corresponding to the marked measurement patch for characterizing misregistration of the first color separation relative to the second color separation; and
- wherein each color separation configuration includes an image line screen having a plurality of parallel lines including respective lines of the first and second color separation;
- wherein the plurality of calibration patches includes a first and second series of patches, wherein for each of the respective first and second series of patches the lines of the first color separation for each respective patch have different incremental screen displacements relative to the lines of the second color separation; and
- wherein:
- the parallel lines of the second patch series are oriented at an angle relative to the parallel lines of the first patch series, where the angle is not an integer multiple of 180 degrees;
- the measurement patch includes a first and second measurement patch, wherein the parallel lines of the second measurement patch are oriented at an angle relative to the parallel line of the second measurement patch, where the angle is not an integer multiple of 180 degrees;
- the characteristic of the curve determined by the calibration module includes a characteristic associated with the measured colorimetric values corresponding to each of the respective first and second series of patches; and
- the calibration function generated by the calibration module includes a first and second calibration function based on the determined characteristic of the curve corresponding to the first and second series of patches, respectively.

8. The color separation misregistration characterization system according to claim 7, wherein each of the respective first and second patch series includes a patch in which the lines of the first and second color separations are in a line-off-line configuration relative to one another and another patch in which the lines of the first and second color separations are in a line-on-line configuration relative to one another.

9. The color separation misregistration characterization system according to claim 7, wherein the predetermined screen displacement is ¼ period.

10. The color separation misregistration characterization system according to claim 7, wherein the calibration function corresponds to a sinusoidal function.

11. The color separation misregistration characterization system according to claim 7, wherein the characteristic of the curve determined by the calibration module includes a maximum and minimum colorimetric value corresponding to each of the respective first and second series of the plurality of calibration patches.

12. The color separation misregistration characterization system according to claim 11, wherein the expected colorimetric value from the expected colorimetric values corresponding to a misregistration characteristic value indicative of no misregistration is midway between the determined maximum and minimum colorimetric values.

13. A method for characterizing color separation misregistration associated with marking a substrate, the method comprising:
- providing an input image having a plurality of calibration patches and a measurement patch, the plurality of calibration patches having a variety of color separation configurations, each color separation configuration using a first and second color separation and the measurement patch having a single predetermined color separation configuration;
- providing for marking a substrate with a copy of the input image using first and second color separation markings to correspond to the first and second color separations, respectively;
- providing for measuring color characteristics of respective marked patches of the plurality of calibration patches and the measurement patch and generating corresponding colorimetric values;
- providing for determining a characteristic of a curve associated with the generated colorimetric values corresponding to the respective patches of the plurality of marked calibration patches;
- providing for generating a calibration function based on the determined characteristic of the curve for providing colorimetric values expected for the predetermined color separation configuration as related to a misregistration characteristic value; and
- determining from the calibration function a misregistration characteristic value that corresponds to the generated colorimetric value corresponding to the marked measurement patch for characterizing misregistration of the first color separation relative to the second color separation in the measurement patch;
- wherein each color separation configuration includes an image line screen having a plurality of parallel lines including respective lines of the first and second color separation;
- wherein the plurality of calibration patches includes a first and second series of patches, wherein for each of the respective first and second series of patches the lines of the first color separation for each respective patch have different incremental screen displacements relative to the lines of the second color separation; and
- wherein:
- the parallel lines of the second patch series are oriented at an angle relative to the parallel lines of the first patch series, where the angle is not an integer multiple of 180 degrees;
- the measurement patch includes a first and second measurement patch, wherein the parallel lines of the second measurement patch are oriented at an angle relative to the parallel line of the second measurement patch, where the angle is not an integer multiple of 180 degrees;

the characteristic of the curve determined by the calibration module includes a characteristic associated with the measured colorimetric values corresponding to each of the respective first and second series of patches; and the calibration function generated by the calibration module includes a first and second calibration function based on the determined characteristic of the curve corresponding to the first and second series of patches, respectively.

* * * * *